Patented Jan. 10, 1928.

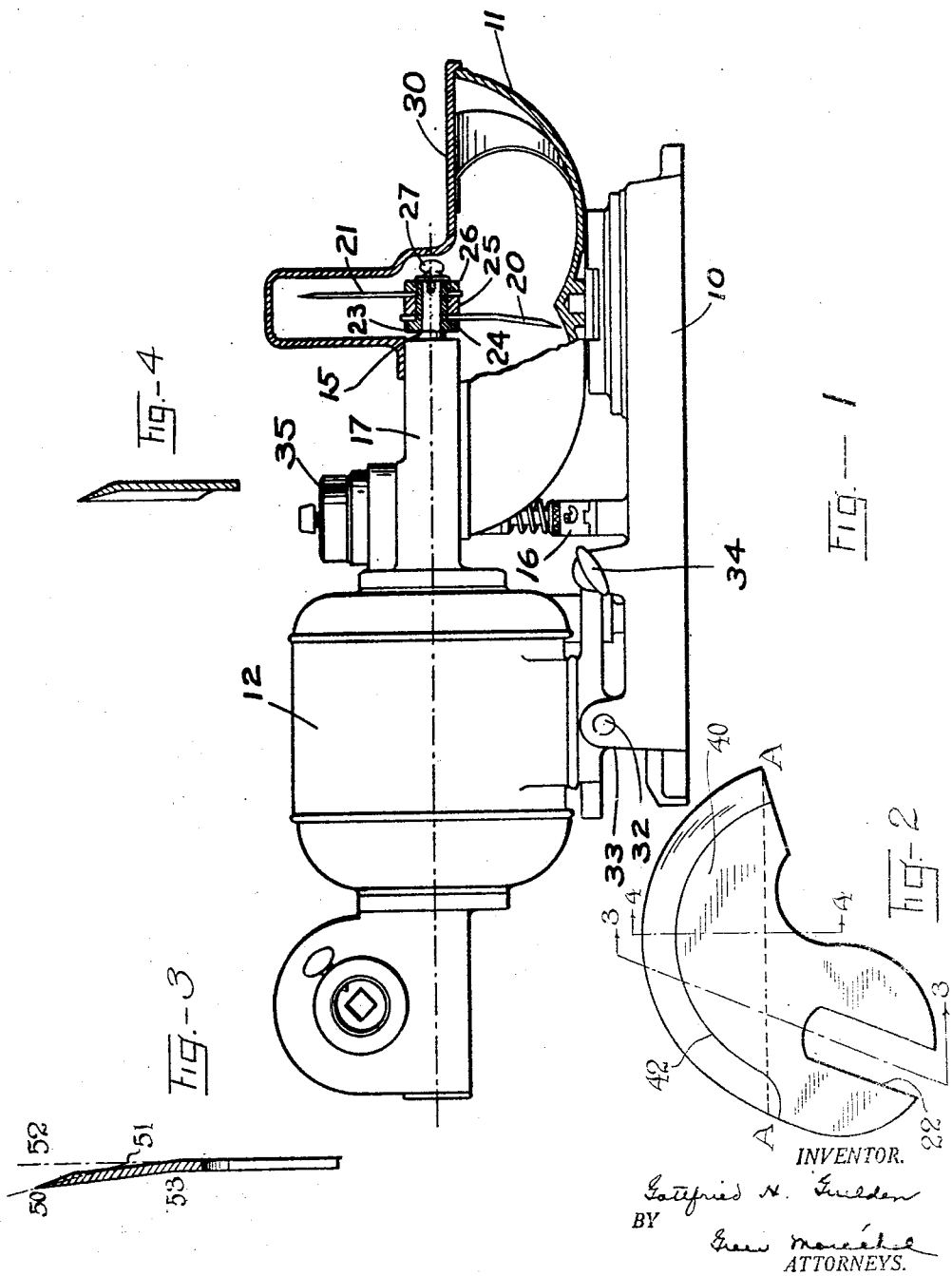

1,655,785

UNITED STATES PATENT OFFICE.

GOTTFRIED H. GUELDEN, OF TROY, OHIO, ASSIGNOR TO THE HOBART MANUFACTURING COMPANY, OF TROY, OHIO, A CORPORATION OF OHIO.

CUTTING KNIFE.

Application filed December 26, 1923. Serial No. 682,689.

This invention relates to apparatus for preparing food stuffs.

One of the principal objects of the invention is to provide apparatus for cutting or chopping food stuffs, or the like, which is provided with an improved form of cutting knife.

Other objects and advantages of the invention will be apparent from the description set out below when taken in connection with the accompanying drawing.

In the drawing, in which like characters of reference designate like parts throughout the several views thereof, Fig. 1 is a side elevation of a form of apparatus for preparing food stuffs provided with a cutting knife constructed in accordance with this invention; certain parts being broken away and shown in vertical section to more clearly disclose the construction;

Fig. 2 is a side elevation of one of the knives forming a part of the apparatus illustrated in Fig. 1;

Fig. 3 is a sectional view through the form of knife shown in Fig. 2, the section being along the line 3—3 of Fig. 2; and Fig. 4 is a sectional view showing a slightly modified form of knife construction, the section being taken through a slightly modified form of knife and along a line corresponding substantially to the line 4—4 of Fig. 2.

While the invention is shown herein as embodied in a form of apparatus which for purposes of convenience, is designated a "silent cutter"; and is intended for chopping meat, vegetables, or the like, preliminary to further treatment in the preparation of food; it is to be understood that this merely constitutes a preferred embodiment thereof and that the invention is not necessarily limited to use in such form of apparatus. The apparatus consists generally of a base 10 upon which is mounted a bowl or container 11, adapted to receive the material to be cut, and a driving motor 12. The bowl is rotatably mounted upon the base and is rotated in any suitable way by the motor 12. Preferably the bowl has associated therewith a train of gears mounted within the base, and not shown, which are in driving connection with the overhanging, extended, shaft 15 of the motor through the medium of a spring pressed clutch 16.

The shaft 15, which is preferably supported within the housing 17, is positioned to one side of a diameter of the bowl and has mounted on its free end two knives 20 and 21 which thus revolve within the bowl to one side thereof as the shaft 15 is rotated by the motor. As shown by Fig. 2 each knife has a slot 22 therein which is adapted to receive a sleeve 23 which is cut away to form a shoulder 24 against which the knife 20 rests. The other knife, which is preferably located substantially diametrically opposite the first named knife, is spaced from that first named knife by means of a spacing ring 25, both knives and the spacing ring being securely held in place by means of a locking ring 26, which is threadedly mounted on said sleeve. The sleeve 23, with the knives assembled thereon is locked upon the shaft 25, and held so as to rotate with that shaft by means of a retaining screw 27, or the like.

Preferably the bowl is provided with a cover 30, which is mounted so that it may be swung upwardly to give free access to the interior thereof. This cover carries a curved scraper which feeds the material being operated upon toward the path of the knives.

The motor is provided with pivots or trunnions 32 which are pivotally mounted within upstanding standards 33 carried by the base, and so may be swung to move the knives 20 and 21 therewith, when the cover 30 is in inoperative position, to give free access to the bowl and permit ready removal thereof. A locking screw 34 is provided for locking the motor in lower, operative, position.

A switch 35 of conventional character is positioned within the motor circuit for starting and stopping operation of the apparatus.

The apparatus as thus far described is substantially the same as the form of apparatus shown in the copending application of Herbert L. Johnston, Serial No. 675,197, filed November 16, 1923 and the particular form of knife hereinafter described is intended, primarily, for use in the form of silent cutter disclosed in that application.

As stated above the bowl 11 is rotated during operation and the knives 20 and 21 revolve about the shaft at the same time. Each of these knives is preferably curved along its cutting edge as shown in Fig. 2, that shape of knife having been found quite satisfactory. As the bowl rotates the food stuffs therein are brought into the path of the knives. As shown the bowl is adapted for clock wise rotation so that the material therein is brought first into the path of the knife 20 and then into the path of the knife 21. The knife 20 is therefore called the "leading knife" and the knife 21 the "following knife."

It has been found that if the leading knife 20 is provided with the conventional type of cutting edge it will tend to push the material being worked upon to one side rather than to cut it, particularly where the knives are positioned to one side as described above. For example, if potatoes are being cut it is found that if the leading knife is of ordinary construction it will during operation either push the potato bodily aside without cutting them, or merely gouge a small piece out of the potatoes which come into contact with it and at the same time roll the potato over. Consequently satisfactory cutting of the material is not secured.

In the form of knife shown herein, this operating difficulty is overcome. In the leading knife 20 the cutting edge of the knife is arranged in a plane which is in advance of the plane of mounting of the knife. In other words the knife blade is bent over as shown in Figs. 2 and 3, for example, so that the cutting edge thereof will travel in a plane which is in advance of, or to the leading side of, the body portion or main plane of the knife. Referring particularly to Fig. 3, the line 50—51 intersecting the angle between the front and rear faces of the cutting edge may be termed the axis of the cutting edge, and it will be observed that this axis is disposed at the leading angle 50—51—52 with reference to the general plane of the main body portion of the cutting knife. It is to be noted further that the front face of the cutting edge is also disposed at a leading angle with reference to the general plane of the main body portion. When so constructed pushing aside of the food will not occur; but on the contrary proper cutting of the food will result, the food being drawn into the path of travel of the knife.

In addition to bending or turning over the cutting portion of the leading knife, as shown in Figs. 1–3, the bending being substantially along the dotted line A—A, the knife is also ground to present a cutting edge. Preferably this edge is ground only along one side, the grinding being on the rear side.

As a result of this overturning the cutting portion of the knife the cutting edge of the knife is thus presented against the path of travel of the material within the bowl. Consequently the knife cuts directly into any food stuffs brought against it, and effects a clear and satisfactory cutting thereof.

And by grinding the cutting portion of the knife along the rear side thereof the cutting effectiveness of the knife is materially increased; for the overturning and the grinding combine to increase the tendency of the knife to cut into the foodstuffs as they are brought into its path of travel. And this overturning of the cutting portion of the knife causes it to actually draw the food material further into its path as the cutting takes place.

This problem is not present with respect to the following, or second, knife 21 for the form of leading knife shown will feed the material into the path of the second or following knife. And so the knife 21 is not bent or turned over, and in addition the cutting edge is ground on both sides; although, of course, it will function entirely satisfactorily if the edge is ground on only one side or if it is bent over.

Instead of bending the knife, as described above, the cutting edge alone may be bent or turned over, as shown in Fig. 4, this bending being of a portion of the knife along the edge of a width substantially equal to the width of the portion which is ground down to give the cutting edge. In this construction also the cutting edge leads the main plane of the knife.

In these constructions the bent over portion in one case, and the bent over edge in the other, function to drag the material being cut toward the plane of the knife, thus facilitating the feeding of the material to the knife, so that satisfactory operation of the device will result.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:—

1. In a silent cutter comprising a rotatable bowl for receiving material to be cut, a motor for rotating said bowl and a rotatable shaft operated by said motor and overhanging said bowl; a cutting knife mounted upon said overhanging shaft, having its cutting portion inclined to the plane of rotation of the body of the knife to travel in advance of the main plane of the knife with respect to the direction of rotation of the bowl.

2. In a silent cutter comprising a rotatable bowl for receiving material to be cut, a motor for rotating said bowl, and a rotatable motor shaft overhanging said bowl; a plurality of cutting knives mounted upon said overhanging shaft, the leading knife having its cutting portion overturned to present the cutting edge against the path of travel of the material within the bowl.

3. A food cutting apparatus comprising a container mounted to move in a predetermined direction and means for moving said container; a cutting knife having the front face of the cutting portion of the knife disposed at a leading angle with reference to the normal to the direction of motion of the container and mounted to move in a direction transverse to the direction of movement of the container, and means for so moving said knife.

4. In a silent cutter comprising a rotatable bowl for receiving material to be cut, a motor for rotating said bowl, and a rotatable motor shaft overhanging said bowl and positioned to one side of a diameter of said bowl; a cutting knife mounted upon said overhanging shaft, to revolve thereabout within the said bowl to one side of a diameter thereof, having its cutting portion overturned at an angle to present the cutting edge of the knife against the path of travel of the material within the bowl.

5. A food cutting apparatus comprising a container mounted to move in a predetermined direction, means for moving said container; a cutting knife having the axis of the cutting portion of the knife disposed at a substantially leading angle with reference to the normal to the direction of motion of the container and mounted to move in a direction transverse to the direction of movement of the container, and means for so moving the knife.

6. In a food cutting apparatus comprising a rotatable container for receiving material to be cut, and means for rotating said container; a cutting knife mounted to move within said container in a direction substantially normal to the plane of rotation of said container, said cutting knife having a bent-over cutting portion to present a cutting edge against the path of travel of the material within the container, said bent-over portion being ground along its rear side only to form said cutting edge, and means for actuating said knife.

7. In a food cutting apparatus comprising a rotatable container for receiving material to be cut, and means for rotating said container; a cutting knife mounted for motion within said container transverse to the direction of rotation of said container, said cutting knife having a flat body portion and a cutting edge portion overturned and inclined with respect to the flat body portion, to present the cutting edge against the direction of travel of the material within the container and in a plane leading the plane of the body portion of the knife.

In testimony whereof I hereto affix my signature.

GOTTFRIED H. GUELDEN.